United States Patent [19]

Meyer

[11] Patent Number: 5,040,308
[45] Date of Patent: Aug. 20, 1991

[54] DEVICE FOR MEASURING DISTANCES

[76] Inventor: Hans Meyer, 24, rue du Bugnon, 1020 Renens, Switzerland

[21] Appl. No.: 568,731

[22] Filed: Aug. 17, 1990

[30] Foreign Application Priority Data

Oct. 4, 1989 [CH] Switzerland .................. 03636/89

[51] Int. Cl.$^5$ .................................................. G01B 7/02
[52] U.S. Cl. ............................................. 33/832; 33/556
[58] Field of Search ............... 33/832, 383, 555, 556, 33/572, 558, 559, 561, 549

[56] References Cited

U.S. PATENT DOCUMENTS

| | | |
|---|---|---|
| 2,371,742 | 3/1945 | Dickerman . |
| 3,113,384 | 12/1963 | Keszler ................................ 33/811 |
| 3,113,385 | 12/1963 | Carter . |
| 3,599,339 | 8/1971 | Adamczyk . |
| 4,276,696 | 7/1981 | Ernst .................................. 33/558 |
| 4,845,855 | 7/1989 | Meyer ................................. 33/832 |
| 4,924,598 | 5/1990 | Gruhler ............................... 33/832 |

FOREIGN PATENT DOCUMENTS 228228 11/1943 Switzerland .
1445115 8/1976 United Kingdom .

Primary Examiner—Harry N. Haroian
Attorney, Agent, or Firm—Young & Thompson

[57] ABSTRACT

The device for measuring distances consists of a column (1), a slide (14) with an adjusting member (5) and a measuring element (6) which are connected with each other by way of a spring (16), a control device (19) for obtaining a constant measuring force, and by way of a precision adjusting means (39) which can be activated and deactivated. The latter exhibits a slidingly supported plunger (40) through which extends a rod (41) connected to the measuring element (6); this rod can be locked or unlocked in the plunger (40) by a screw (48) serving as a resetting means. An eccentric (40) engages into a cutout (50) of the plunger (40) and permits precision adjustment of the measuring element (6) for tracing purposes upon locking of the rod (41). With the precision adjusting means (39) being deactivated, the device is usable for customary vertical measuring with measuring pressure control.

10 Claims, 2 Drawing Sheets

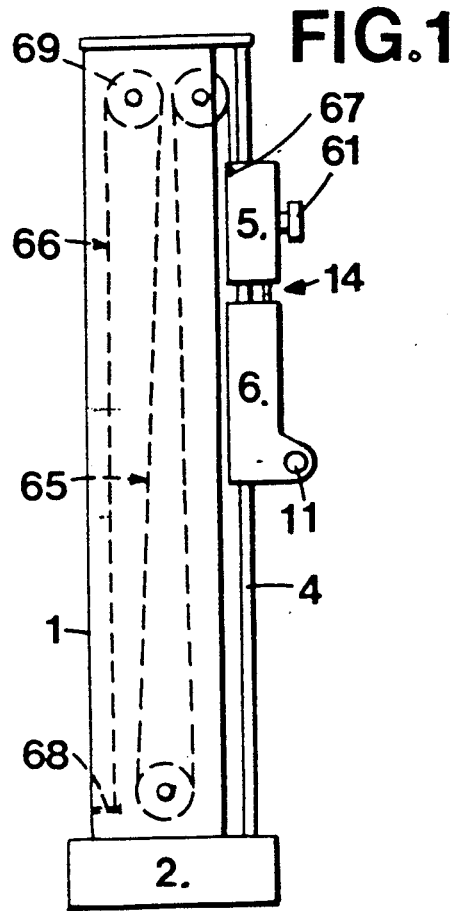
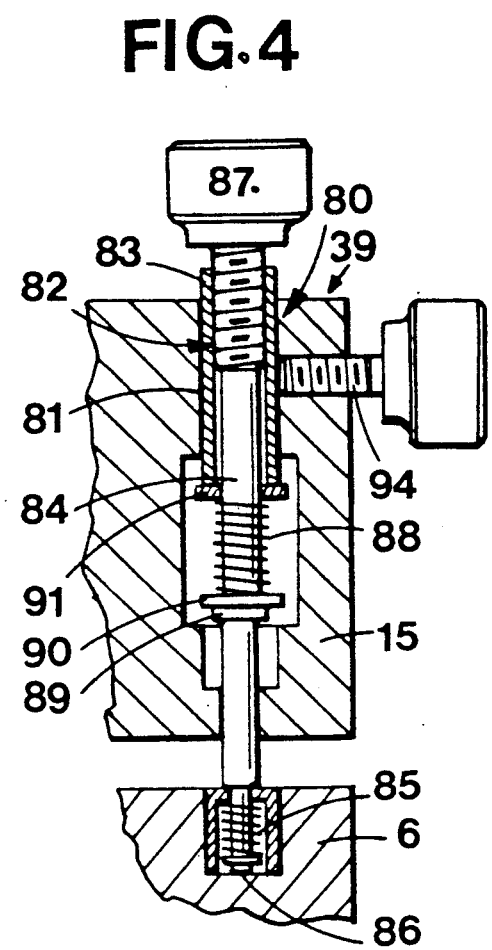
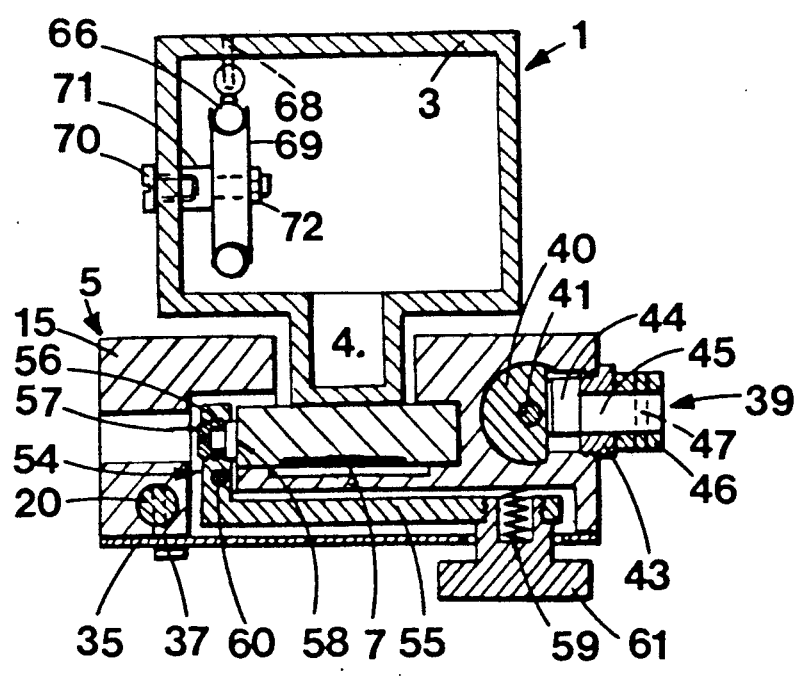

DEVICE FOR MEASURING DISTANCES

The invention relates to a device for measuring distances comprising a rail, a slide arranged on this rail exhibiting a first component slide designed as an adjusting member and a second component slide equipped as a measuring element with a measuring pickup, connecting members between these first and second component slides, and a triggerable stopping means for locking the first component slide on the rail.

Such a device has been disclosed in EP 0 223 736 and permits the execution of precise vertical measurements with low measuring pressure. The conventional device is, however, unsuitable for tracing since, during this operating step, the measuring element must not move but is to be set very precisely.

It is an object of the invention to remedy this deficiency and to provide a device, the measuring element of which is readily adjustable, permits control of the measuring force, and is usable for precise marking.

For this purpose, the device according to this invention is characterized in that the connecting members comprise a control device for obtaining a predetermined measuring force, a precision adjustment means for regulating the relative position of the second component slide with respect to the first component slide, and a resetting means making it possible to activate either the aforementioned control device for the performance of a measurement with a predetermined measuring force, or the precision adjustment means for the performance of a tracing step.

With the adjusting member being locked in place by clamping, it is thus possible to accurately set the position of the second component slide carrying the tracer needle, the device being usable, with the precision adjustment means being deactivated, for the conventional vertical measurement with measuring pressure control.

Advantageously, the precision setting means exhibits a sliding piece connected with one of the component slides and slidingly supported in a guide means of the other component slide in the measuring direction, this sliding piece being connected with this other component slide by means of a regulating member. The resetting means is fashioned so that it locks the sliding piece in place in the guide means for the execution of a tracing operation, and unlocks the sliding piece for the performance of a measurement.

In a preferred embodiment, a plunger displaceable in the measuring direction is slidingly arranged in the first component slide, a rod connected with the second component slide being extended through this plunger and lockably disposed in the plunger by means of the resetting device. By means of a regulating member, the plunger can be displaced in the first component slide.

This permits a very simple structure; advantageously, the regulating member consists of an eccentric supported in the first component slide and engaging into a cutout of the plunger, the latter being urged resiliently against the eccentric so that precision adjustment thereby takes place without any amount of play.

In this arrangement, the use of an eccentric permits rapid and accurate precision adjustment to a given value.

Preferably, the control device consists of a rod connected, on the one hand, with one component slide and being, on the other hand, extended through the other component slide, this rod being equipped with a collar on which two springs are mutually supported by way of disks, these springs resting, on the other hand, against abutments in the aforementioned other component slide. This has the result that, upon setting of the slide by a certain measure past the contact point of a feeler, attached to one of the component slides, with a measuring object, a measuring pressure is exerted which corresponds to the bias of the springs.

This type of structure permits the execution of measurements with a predetermined measuring pressure if the precision adjustment means has been deactivated.

A device of an especially lightweight structure is attained by nullifying the weight of the two component slides at least partially by a counter pulley consisting of a spring, one end of which is attached to the first component slide, leads over at least two rollers mounted to the rail, and the other end of which is attached to the rail.

In this way, a counterweight can be avoided, the weight of the device can be kept low, and its transportability can likewise be facilitated.

Additional advantageous embodiments of the invention can be seen from the features of the dependent claims and from the following description of an embodiment and a variation, illustrated in the appended drawings wherein:

FIG. 1 is a lateral view of the measuring device.

FIG. 3 is a section A—A through FIG. 2.

FIG. 4 is a fragmentary sectional view of the precision adjustment means of a variation.

Figure 2:
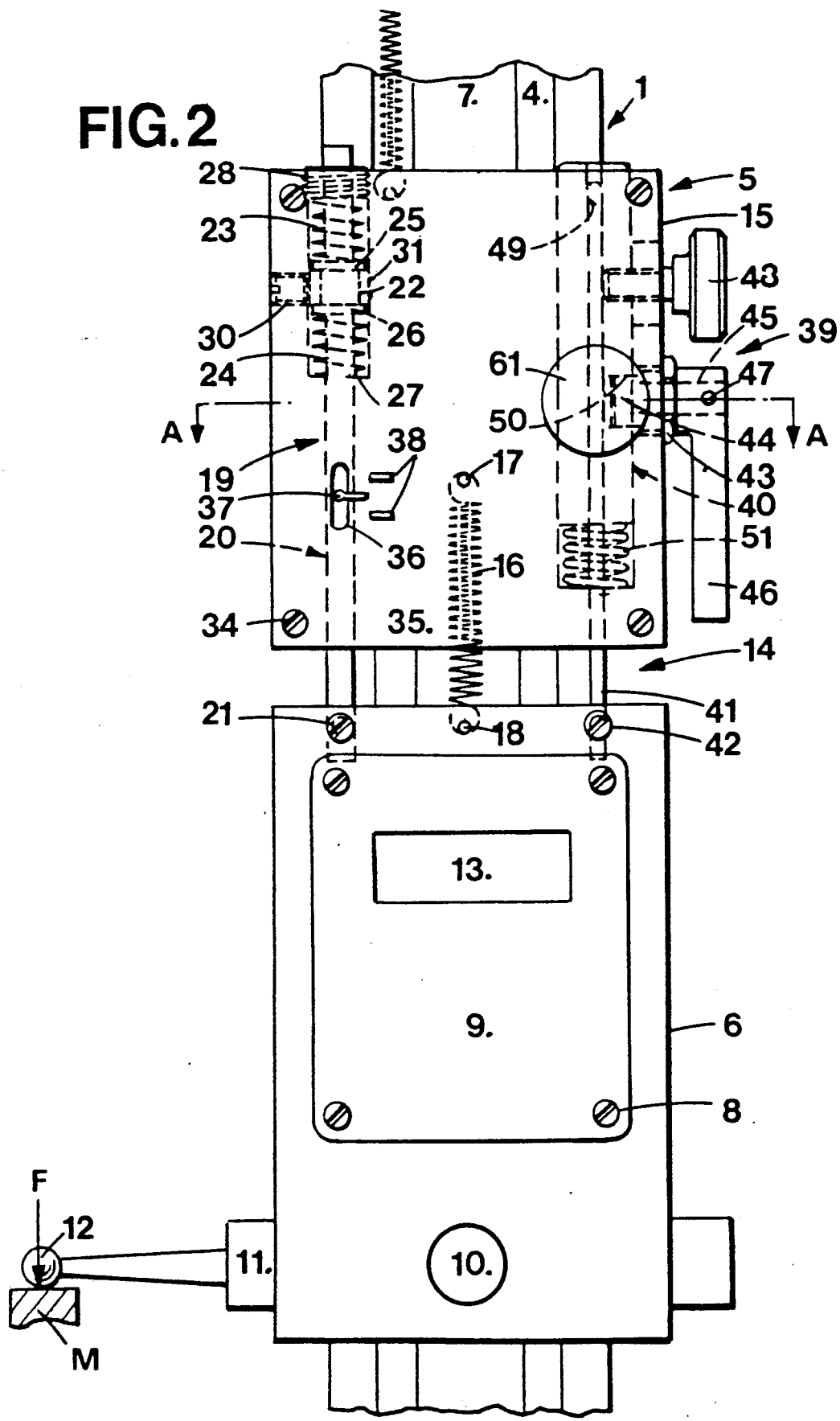
FIG. 2 is an elevational view of the measuring element and of the adjusting member coupled therewith.

As can be seen from FIGS. 1-3, the measuring device comprises a column 1 with a base 2. The column, consisting of a hollow molding 3, is connected to a rail 4 serving as a guide means for a slide 14. The latter includes a component slide designed as an adjusting member 5 and a component slide serving as a measuring element 6. A scale 7 is set into the rail 4; this scale is read off by a pickup unit 9 with display area 13 installed in the measuring element 6 and mounted by means of screws 8.

The measuring element 6 contains a shaft 11 that can be clamped into place by means of a screw 10, the end of this shaft being designed as a ball caliper 12.

The adjusting member 5 consists of a body 15 guided on the rail 4. A spring 16 is suspended, on the one hand, on a pin 17 of the body 15 and, on the other hand, on a pin 18 of the measuring element 6 and is dimensioned so that its spring force corresponds to the weight of the measuring element 6, the latter thus being floatingly suspended.

In order to achieve a constant measuring force, the device has a control unit 19. An axle 20 slidingly arranged in the body 15 is connected for this purpose at its lower end to the measuring element 6 by means of a screw 21. On its opposite end, the axle has a collar 22 on which two springs 23 and 24 are supported by way of disks 25, 26. On their opposite sides, these springs 23, 24 rest, on the one hand, on a surface 27 in the body 15, and on the other hand, on a locking screw 28 arranged in the body 15. The disks 25, 26 are supported, in turn, on a sleeve 31 locked within the body 15 by means of a screw 30.

The adjusting member 5 has on its frontal side a lid 35 attached by means of screws 34. The body 15 and the lid 35 are equipped with a longitudinal opening 36 through which extends a pointer 37 mounted on the axle 20, this pointer moving with respect to two markings 38 provided on the lid 35.

A plunger 40 is likewise movably mounted in the body 15 and has a bore 49 through which extends a likewise movably mounted rod 41; the latter is fixedly held in the measuring element 6 by means of a screw 42. An axle 45 equipped with an eccentric 44 is disposed in a screw 43 attached in the body 15; this axle 45 is provided with a lever 46 retained on the axle by means of a pin 47. The eccentric 44 engages into a cutout 50 of the plunger 40, the plunger being urged against the eccentric 44 by means of a spring 51. Thereby, the clearance between eccentric 44 and plunger 40 is eliminated, on the one hand; on the other hand, the thus-obtained friction between plunger 40 and eccentric 44 takes care of securing a once-set eccentric position.

By means of a screw 48 located in the plunger 40 the rod 41 in the plunger can be blocked. The eccentric 44 accordingly constitutes, with the rod 41 being blocked, a precision adjustment means 39 permitting displacement of the measuring element 6 over small distances with respect to the adjustment member 5. The screw 48 serves as the resetting device making it possible either to activate the control device 19 for execution of a measurement with a predetermined measuring force, or to operate the precision adjusting device 39 for the performance of a tracing operation.

The body 15 is retained on the rail 4 of column 1 by means of a brake 54 fashioned as a lever 55 (FIG. 3). A bead 58 countersunk into the setscrew 57 is arranged at the lever end 56, this bead being urged against the rail 4 under the effect of a spring 59 acting on the other lever end. The lever 55 is supported on a pin 60 set into the body 15. By exerting pressure on a button 61 set into the lever 55, the latter is relieved whereby the body 15 can be shifted on the rail 4 without resistance.

For easier operation, it is advantageous to at least partially nullify the weight of the measuring element 6 and the adjusting member 5 by means of a counter pulley 65. This is accomplished (FIGS. 1 and 3) by a spring 66 attached, on the one hand, to the body 15 of the adjusting member by means of a pin 67, on the other hand to the column 1 by way of a pin 68. Three rollers 69 are supported in the column 1 on axles 71 retained by means of screws 70, these rollers being secured by spring rings 72. The spring 66 is guided over the three rollers 69.

Since it is important to subject the tensile force of the spring 66 to minimum change during the adjustment of the slide 14, and to prevent this force at any cost from exceeding the braking force exerted by the adjustment member 5 on the rail 4 by way of the brake 54, the spring 66 must exhibit a maximally flat characteristic. This is obtained by the roller guide system shown in FIG. 1. For attaining a satisfactory effect, it is necessary for the length of the tensioned spring in the uppermost position of the adjusting member 5 to correspond to at least twice the entire displacement path. It is advantageous to provide a spring with wound-in pretensioning since this results in an especially level characteristic, respectively spring curve.

The mode of operation of the various elements will be described hereinbelow:

The coarse adjustment of the slide 14 takes place via the adjusting member 5. The slide is released by depressing the button 61 and can then be shifted in the measuring direction, the measuring element 6 being entrained by means of the axle 20. The adjusting member 5 is then moved downwards, for example, until the feeler 12 touches a object M to be measured. By further infeeding of the adjusting member, the spring 23 is compressed and then acts on the feeler with a predetermined measuring force attained when the pointer 37 points to the top marking 38. An analogous case arises when the measuring operation proceeds from the bottom toward the top.

During tracing, the feeler 12 is replaced by a tracer needle which is to be set to a specific measure with maximum accuracy. By depressing the button 61, the measuring element 6 is adjusted by means of the adjusting member 5 to such an extent that the predetermined measuring value appears approximately in the display area 13 of the pickup unit 9. By blocking the rod 41 in the plunger 40 by means of the screw 48 serving as the resetting means, the adjusting member 5 is thus fixedly connected to the measuring element 6. By rotating the eccentric 44 by means of the lever 46, the precision adjustment can then be carried out without any clearance. Further measuring value adjustments take place by resetting the lever 46 into the initial position, renewed adjustment of the adjusting member, and so forth. When it is desired to change over from tracing to measuring, the screw 48 must be loosened whereby the rod 41 and thus the measuring element 6 are released.

The variation of the precision adjustment device 39 shown in FIG. 4 exhibits a screw adjustment means 80 in place of the eccentric 44. This adjustment means comprises a sleeve 83 slidingly supported in a bore 81 of the body 15 and equipped with an internal thread 82, and a screw stem 84 in engagement with the sleeve; this screw stem is received in the measuring element 6 rotatably without clearance at one end by means of a spring 85 and a spring ring 86 and carries at the other end an operating knob 87. A spring 88 rests, on the one hand, on a disk 90 in contact with a collar ring 89 of the screw stem 84 and, on the other hand, on an end ring 91 of the sleeve 83. The spring 88 permits the avoidance of any thread clearance whatever between the sleeve 83 and the screw stem 84. By means of a screw 94 arranged in the body 15 and serving as the resetting means, the sleeve 83 can be blocked in the body 15. The precision adjustment between the adjusting member 5 locked onto the rail 4 and the measuring element 6 thus takes place by rotation of the operating knob 87 after blockage of the sleeve 83. The measuring value can be seen from the display area 13.

The invention is, of course, not limited solely to the illustrated embodiments but, rather, the latter can be modified additionally within the idea of the invention as defined in the claims. Thus, it is possible, for example, to support the measuring element 6 at the adjusting member 5 by way of a counterweight arrangement in order to avoid vibrations. The counter pulley 65 can be replaced by a scroll spring or a counterweight. The measuring pressure can be controlled by means of different devices, for example locking elements. The precision adjustment means between the first and second component slides could also be installed in measuring devices which are not arranged vertically, such as, for example, slide calipers and horizontal measuring slides with a slide exhibiting an adjusting member.

I claim:

1. Device for measuring distances comprising a rail (4), a slide (14) arranged on this rail exhibiting a first (5) component slide fashioned as an adjusting member and a second (6) component slide equipped as a measuring element with a measuring pickup (9), connecting members (16, 20, 41) between these first and second component slides (5, 6), and a triggerable stopping means (54) for locking the first component slide (5) on the rail (1), characterized in that the connecting members comprise a control device (19) for obtaining a predetermined measuring force, a precision adjustment means (39) for regulating the relative position of the second component slide (6) with respect to the first component slide (5), and a resetting means (48; 94) making it possible to activate either the aforementioned control device (19) for the performance of a measurement with a predetermined measuring force, or the precision adjustment means (39) for the performance of a trading step.

2. Device according to claim 1, characterized in that the precision adjustment means (39) exhibits a sliding piece (41; 83, 84) connected with one of the component slides (6), this sliding piece being slidingly supported in a guide means (49; 81) of the other component slide (5) in the measuring direction and being connected with this other component slide (5) by means of a regulating member (44; 84), wherein the resetting means (48; 94) is designed so that it locks the sliding piece (41; 83, 84) in place in the guide means (49; 81) for the execution of a tracing operation and unlocks this sliding piece for the performance of a measurement.

3. Device according to claim 2, characterized in that a plunger (40) displaceable in the measuring direction is slidingly supported in the first component slide (5), a rod (41) connected to the second component slide (6) being extended through this plunger and being lockably supported in the plunger (40) by means of the resetting device (48), the plunger (40) being displaceable in the first component slide (5) by means of the regulating member (44).

4. Device according to claim 3, characterized in that the regulating member consists of an eccentric (44) supported in the first component slide (5), this eccentric engaging into a cutout (50) of the plunger (40), the plunger (40) being resiliently urged against the eccentric (44) so that the precision adjustment by means thereof takes place without clearance.

5. Device according to claim 2, characterized in that a screw stem (84) is rotatably connected with the second component slide (6) and is in engagement with the internal thread (82) of a sleeve (83), the latter being slidingly supported in the first component slide (5) and being lockable in the latter by means of the resetting means (94).

6. Device according to claim 5, characterized in that a spring (88) is supported between projections (90, 91) of the screw stem (84) and of the sleeve (83) in such a way that the precision adjustment takes place without clearance by rotation of the screw stem (84).

7. Device according to claim 1, characterized in that a spring (16) is installed between the first and second component slides (5, 6), the tensile force of this spring corresponding to the weight of the second component slide (6).

8. Device according to claim 1, characterized in that the control device (19) consists of a rod (20) which, on the one hand, is connected to one of the component slides (6), on the other hand is extended through the other component slide (5), this rod being provided with a collar (22) on which two springs (23, 24) are mutually supported by way of disks (25, 26), these springs resting, on the other hand, against stops (27, 28) in the aforementioned other component slide (5), with the effect that, upon adjusting the slide (14) by a certain measure past the contact point of a feeler (12) attached to one of the component slides (5) with an object to be measured (11), a measuring force is exerted corresponding to the bias of the springs (23, 24).

9. Device according to claim 8, characterized in that the rod (20) is provided with a pointer (37) moving with respect to markings (38) provided on the aforementioned other component slide (5).

10. Device according to claim 1, characterized in that the weight of the two component slides (5, 6) is nullified at least in part by a counter pulley (65) consisting of a spring (66), one end of which is attached to the first component slide (5), extends over at least two rollers (69) mounted to the rail (4), and the other end of which is attached to the rail (4).

* * * * *